June 21, 1960    J. V. SANTSCHI    2,941,338
APPARATUS FOR GLASS DRILLING
Filed Feb. 10, 1958    2 Sheets-Sheet 2
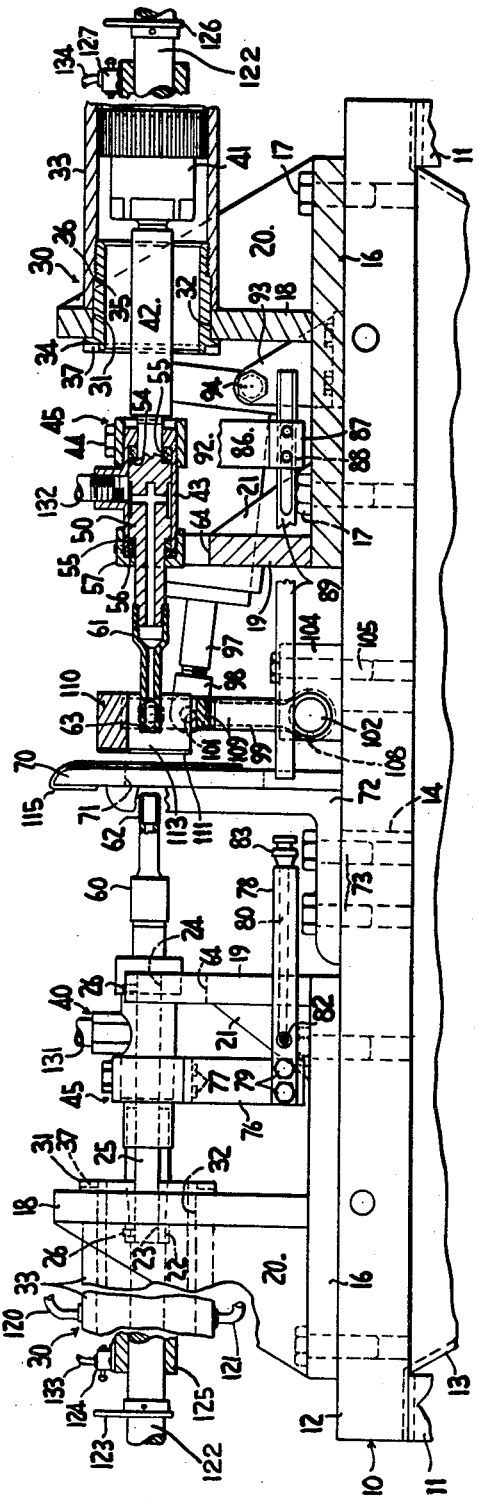
FIG. 2
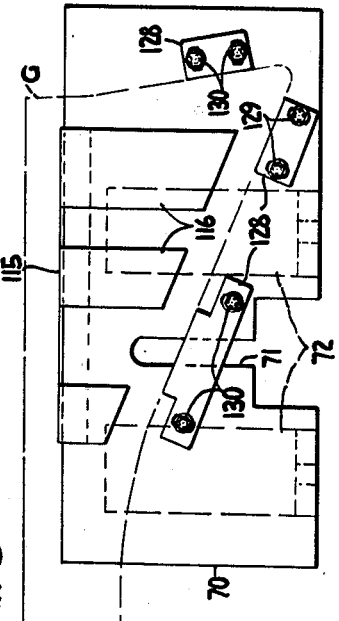
FIG. 4
FIG. 3
INVENTOR.
*JULIUS V. SANTSCHI*
BY
*Oscar L Spencer*
ATTORNEY United States Patent Office 2,941,338
Patented June 21, 1960

2,941,338

APPARATUS FOR GLASS DRILLING

Julius V. Santschi, Festus, Mo., assignor to Pittsburgh Plate Glass Company, Allegheny County, Pa., a corporation of Pennsylvania Filed Feb. 10, 1958, Ser. No. 714,333

7 Claims. (Cl. 51—81)

This invention relates to an apparatus for drilling a hole in a glass sheet.

For various uses of a glass sheet it is desirable to drill a hole in the sheet. For example, glass sheets cut to pattern are used as ventilator windows for the front doors of automobiles. In the past it has been customary to pivotally mount the ventilator windows by mounting a channel member around a substantial portion of the periphery of the glass sheet and a pivotal mounting device is secured to the channel member. It has been found to be possible to eliminate the channel member by drilling at least one hole in the glass sheet and then through the hole securing a pivotal mounting component to the glass sheet. Of course, the glass sheet is tempered after drilling the hole or holes.

The apparatus of the present invention has a pair of diamond-containing hollow tool bits mounted in opposed axial alignment. The apparatus has a backup plate and a clamp pad between which the glass sheet is secured for the drilling operation. The clamp pad is moved by an air cylinder from a position away from the glass sheet supported against the backup plate to a position abutting the glass sheet so that in the latter position the backup plate and the clamp pad hold the glass sheet in position. The backup plate has locator blocks mounted on it for properly positioning the glass sheet so the bits can drill the glass at the desired location. Each of the bits is rotated and moved axially by an air feed drill. The bits are connected to the drills by water swivels for feeding coolant axially to the bits.

The apparatus of this invention uses a valve and piping arrangement for the air feed drills and the air cylinder that operates the clamp pad so that, after positioning the glass sheet against the backup plate as determined by the locator blocks, the actuation of a valve actuates the air cylinder to move the clamp pad against the glass sheet. A the same time the drill bits are moved towards each other along with rotation also provided by the air feed drills. The initial distances between the bits is chosen so that, before the bits, during their drilling action into the glass sheet, can contact each other, one of the drill bits is automatically retracted by its air feed drill with discontinuation of its rotation. The other bit continues to drill into the glass sheet until its leading edge has reached at least the maximum point of drilling entry of the other bit. Then the latter drill bit is automatically retracted with cessation of its rotation and the feeding of coolant to the drill bits, along with withdrawal of the clamp pad by reversing of its air cylinder. With the apparatus of the present invention, as briefly described above, a hole in the glass sheet can be quickly drilled automatically once the sequence of steps is initiated.

The apparatus of this invention is described below in detail for a preferred embodiment that is illustrated in the drawings in which similar parts are designated by the same numeral and in which:

Fig. 2 is an elevation, partly broken away, of the apparatus;

Fig. 3 is an elevation of the backup plate and locator blocks, forming part of the apparatus and to be mounted as shown in Figs. 1 and 2, and an outline of a glass sheet in which a hole is to be drilled and Fig. 4 is a schematic drawing of the valve and piping arrangement utilized in the apparatus of the present invention for automatically drilling a hole in a glass sheet.

Figure 1:
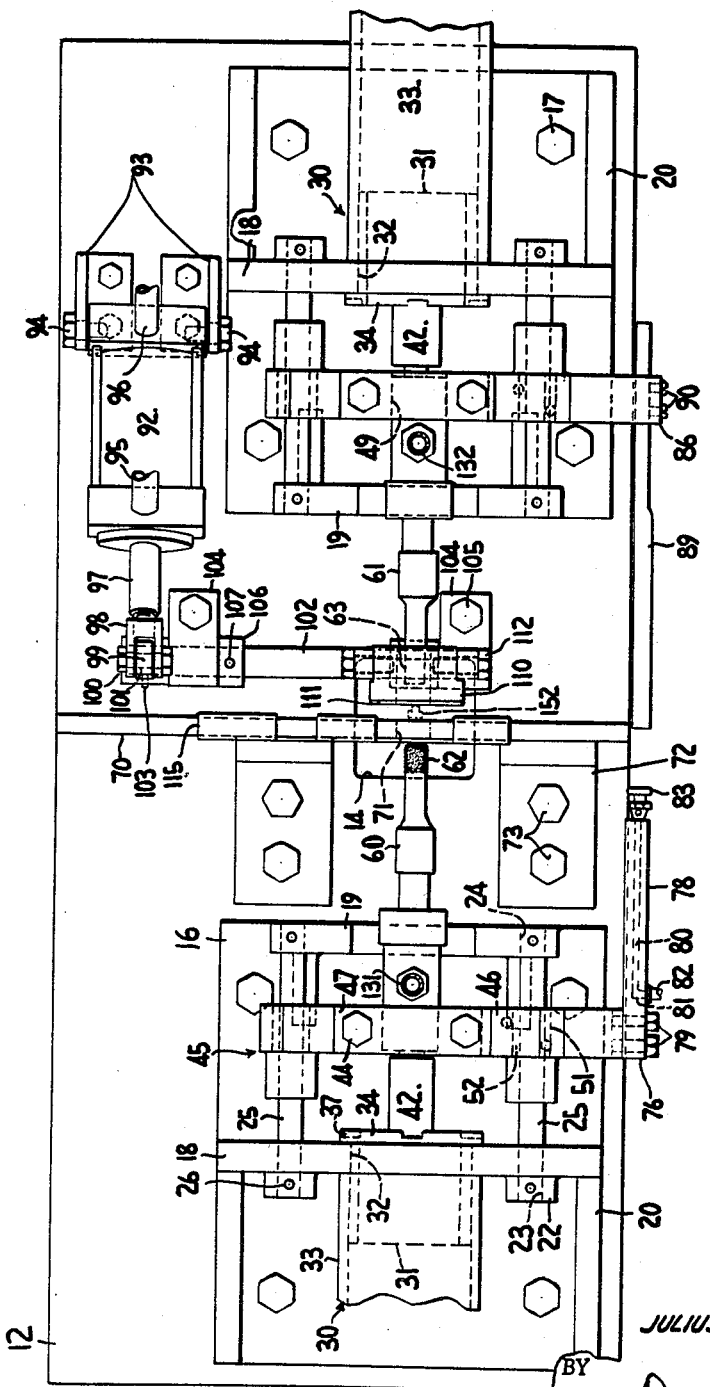
Fig. 1 is a plan view of the apparatus of the invention.

The apparatus has a supporting structure generally indicated at 10 including upright supports 11 and a table or plate 12. The table 12 is mounted on supports 11. A drip pan 13 with outlet pipe (not shown) is secured to the supporting structure 10 below table 12. The table 12 has a generally centrally located hole 14.

A pair of plates 16 is secured on table 12 by bolts 17. On each of plates 16 is welded upright support plates 18 and 19. A pair of triangular plates 20 is welded to the vertical marginal portions of each of plates 18 and to each of plates 16. Similarly, a pair of triangular plates 21 are welded to each of plates 16 and 19. To each of plates 18 is welded a pair of blocks 22. Holes 23 are drilled in blocks 22 and plates 18 in alignment with holes 24 drilled in plates 19. In each set of plate 18 and plate 19 guide rods 25 are slip fitted, each in hole 23 and hole 24. Each of guide rods 25 is secured in position by set screws 26. The holes 23 and 24 are drilled so that guide rods 25 are parallel to the table and to the center line of the apparatus.

A pair of air feed drills generally indicated at 30 is mounted to plates 18 by means of collars 31. Each of collars 31 extends through a hole 32 in plate 18 and is externally threaded at one end to secure to it cylindrical housing extension 33 of drill 30. The cylinder 33 is internally threaded along a portion of it. The collar 31 has a shoulder 34 that abuts plate 18 and a shoulder 35 that abuts a shoulder 36 of cylinder 33 of air feed drill 30. With this construction the collar 31 securely mounts air feed drill 30 to plate 18. Each of the collars 31 has radial recesses 37 in its outside face for engagement by a spanner wrench (not shown) for securing the air feed drill 30 to plate 18 by collar 31.

A water swivel generally indicated at 40 is connected to a chuck 41 of each of air feed drills 30 by an adaptor socket 42. Secured on the housing 43 of each of swivels 30 by means of cap screws 44 is a swivel guide indicated generally at 45 that is a support plate 46 and a cover bar 47 held against plate 46 by cap screws 44. Opposite central portions of sides of plate 46 and bar 47 provide a central aperture 49 in guide 45 through which extends housing 43 of swivel 40. A spindle 50 of swivel 40 is in housing 43. The plate 46 of swivel guide 45 has a pair of horizontal holes 51 in which are mounted bushings 52. The rods 25 extend through bushings 52 so that the swivel 40 is guided by means of rods 25 during the axial movement of swivel 40 provided by air feed drill 30.

Each spindle 50 is rotatably mounted in housing 43 of swivel 40 in the conventional manner by the use of washers 54, packing rings 55, spacing collar 56 and packing adjusting cap 57 threaded on housing 43.

A bit 60 is threaded on spindle 50 rotated and moved axially by one of air feed drills 30 and a bit 61 is mounted on spindle 50 rotated and moved axially by the other air feed drill 30. The bits 60 and 61 are hollow cylinders. The portions 62 and 63 at one end of bits 60 and 61, respectively, are constructed of diamonds in a matrix of metal and brazing material and such are made, for example, by the method described in U.S. Patent No. 2,210,-039 granted on August 6, 1940, and entitled "Method of Making Diamond Tools." In the preferred embodiment the wall of the tubular diamond-containing portion 63 of bit 61 is thicker than the wall of portion 62 of bit 60, as shown in Fig. 2.

Each of plates 19 has a top central semicircular slot 64 in alignment with hole 32 so that plate 19 does not prevent axial movement of swivel 40.

A backup plate 70 has a central slot 71 extending from the bottom of plate 70. The top of slot 71 is above bit 60 so that its diamond-containing portion 62 can be driven by air feed drill 30 through slot 71 into engagement with a glass sheet G (shown in Fig. 3). The backup plate 70 is welded to a pair of angle irons 72 that are secured to table 12 between plates 16 and above hole 14 by bolts 73.

A bracket 76 is secured by cap screws 77 to one of the swivel guides 45 so that bracket 76 moves with axial movement of swivel 45 and bit 60 mounted on spindle 50. A poppet extension 78 is bolted to bracket 76 by cap screws 79. The poppet extension 78 has an axial passageway 80 from its free end to a radial passageway 81 communicating with it. A pipe fitting 82 is threadably secured in the radial passage and a poppet valve 83 is threadably engaged in the poppet extension 78 at the free end of the axial passageway 80. Similarly a bracket 86 is secured by cap screws 77 to the other swivel guide 45. A block 87 having an aperture 88 is welded to bracket 86 and adjustably supports a push rod 89 that is secured to block 87 by set screws 90 that engage a flattened portion of push rod 89. Thus with movement of swivel guides 45 toward each other, poppet extension 78 and its poppet valve 83 move towards pusher rod 89 and it moves towards poppet valve 83 and poppet extension 78. Poppet valve 83 is a safety poppet valve, as described below.

An air cylinder 92 is pivotally mounted to air cylinder supports 93 that are bolted to table 12. The pivotal mounting is obtained by bolts 94 that are screwed into threaded apertures of an end block of air cylinder 92 and the enlarged portion of each bolt 94 in aperture of support 93 serves as a bearing. The pipes 95 and 96 of air cylinder 92 provide for inlet and outlet of air, as described below, to extend and retract piston rod 97 of air cylinder 92. A clevis 98 is secured on the threaded end of piston rod 97. A lever arm 99 is secured between the arms of clevis 98 by nut 100 and bolt 101. The other end of lever arm 99 is in the form of a collar which is mounted on a clamp shaft 102 by a set screw 103.

A pair of bearing supports 104 for clamp shaft 102 is bolted to table 12 by cap screws 105. The lever arm 99 is on one side of and is abutting one of bearing support 104 and on the other side of that bearing support 104 is a collar 106 secured on shaft 102 by set screw 107. Thus lever arm 99 and collar 106 cooperate with the abutting bearing support 104 to prevent axial movement of shaft 102.

On shaft 102 between bearing supports 104 is secured by set screw 108 a clamp yoke 109. Between the upwardly extending arms of yoke clamp 109 is a clamp pad 110 having adhered to its front face a rubber pad 111. The clamp pad 110 is pivotally mounted between the upwardly extending arms of clamp yoke 109 by means of bolts 112 threadably secured through flat surface portions of clamp pad 110. The bolts 112 each has an enlarged cylindrical bearing portion in contact with the walls of a hole through an arm of clamp yoke 109 to provide pivotal movement of the clamp pad so that it can be free to assume a vertical position. The front face of pad 111 abuts glass sheet G. This pivotal movement is provided because the clamp yoke 109 is moving the clamp pad 110 through an arcuate path towards glass sheet G.

The clamp pad 110 and rubber pad 111 on its front face have a vertical slot 113, that is open at the bottom, so that the portion 63 of drill bit 61 can pass through slot 113.

Secured over the top of backup plate 70 is a rubber sheet 115 that is shown in the embodiment of Fig. 3 as having downwardly extending tab portions 116 on the front face of plate 70, that is, the face that opposes clamp pad 110. Thus rubber sheet 115 and rubber pad 111 provide for resilient contact with glass sheet G placed between them and plate 70 and clamp pad 110 prevent movement of glass sheet G during the drilling by portions 62 and 63 of bits 60 and 61.

As seen in Fig. 2 for one of the air feed drills 30, each of drills 30 has pipes 120 and 121 for introducing and withdrawing air from the air cylinder portion of drill 30. A piston rod 122 of the air cylinder portion extends rearwardly outside air feed drill 30. A dog 123 is adjustably secured on rod 122 of the drill 30 that rotates and axially moves bit 60. The dog 123 engages a poppet valve 124 mounted on a housing extension 125 of that air feed drill 30 when bit portion 62 is moved a predetermined distance into glass sheet G. Similarly a dog 126 adjustably secured on rod 122 of the other air feed drill 30 engages a poppet valve 127 mounted on that drill 30 when bit portion 63 is moved a predetermined distance into glass sheet G.

The shape of slot 71 in backup plate 70 is shown in Fig. 3. Also shown in Fig. 3 are the tab portions 116 of rubber sheet 115. Locator blocks 128, which are made preferably of a phenolic resin, have slotted holes and are mounted by bolts 129 and washers 130 using threaded holes of plate 70. The locator blocks 128 accurately position the glass sheet G when it is manually placed against tab portions 116 of rubber sheet 115 and against blocks 128. The accurate positioning of sheet G insures that the bit portions 62 and 63 will drill the hole in sheet G at the correct position. For different patterns of glass sheets, of course, different plates 70 having suitably positioned locator blocks 128 mounted are used. Replacement of a backup plate 70 is a simple matter because the angle irons 72 welded to plate 70 are secured to table 12 by bolts 73.

A pipe 131 is connected to the threaded inlet portion of housing 43 of swivel 40 to which is connected bit 60. Similarly a pipe 132 is connected to the inlet portion of housing 43 of the other swivel 40. Pipes 133 and 134 are connected to poppet valves 124 and 127, respectively.

Referring to Fig. 4 a poppet valve 135 is opened by a foot-operated lever 136 that is biased away from valve 135 by spring 137. Connected to poppet valve 135 is pipe 140 that communicates with pipes 138 and 139 which communicate with valves 141 and 142, respectively.

Valves 141 and 142 are of the balanced type as described and shown in U.S. Patent No. 2,607,197, granted on August 19, 1952, and entitled "Sequential Motor Operation Under Control of Individual, Fluid Actuated, Relieved Pressure Valves." This type of valve has a casing providing a main valve chamber to which air under pressure is constantly supplied through an inlet port connected by a pipe to an air pressure source. One wall of the chamber provides a seat for a slide valve connected with an actuating plunger and normally urged by a spring against its seat. The inlet port is located beyond the range of movement of the slide valve so that air is constantly supplied to the chamber. The valve casing has three passages opening into the casing through the valve seat. Two of the passages are connected by pipes to an air cylinder. Connected to the third passage is a pipe open to the atmosphere at its other end. In one position of the slide valve the first of the two passages communicates with the main chamber and the second is in communication with the atmosphere through the third passage. In the other position of the slide valve the second of the two passages communicates with the main chamber and the first communicates with the atmosphere through the third passage.

In this balanced-type of valve there is a plunger that is provided with two opposed pistons that operate in two control chambers normally closed except for communication with the main pressure chamber through small ports in the pistons. The control chambers are maintained under constant pressure so that the plunger and, therefore, the slide valve is normally in a state of balance. The shifting of the slide valve from one position to the other is effected by unbalancing the pressures in the control chambers. This is accomplished by momentarily opening a poppet valve communicating by a pipe with the proper control chamber so that the plunger will move due to the pressure differential. This action moves the slide valve to the other position.

The main pressure chamber of valve 141 communicates through pipe 143 with pipe 144, which is connected to a source (not shown) of air under pressure. The main chamber of valve 142 communicates through pipe 145 with pipe 144. Momentarily moving lever 136 against valve 135 to open it releases air under pressure in pipes 138, 139 and 140 communicating with a control chamber of each of valves 141 and 142. This unbalances the control chambers in each of valves 141 and 142 to move their slide valves so that air through air under pressure in the main chambers of valves 141 and 142 provide air under pressure into pipes 121. At the same time the slide valves in valves 141 and 142 provide communication between pipes 120 from drills 30 and pipe 146 in each of valves 141 and 142. Pipes 146 are open to the atmosphere at the other end. Air under pressure by pipes 121 to air feed drills 30 and the exhaust of air from the air cylinders in drills 30 via pipes 120 and 146 start drills 30 so that through the rotary-vane type of motor portion of each, spindles 50 and bit portions 62 and 63 are rotated. At the same time the air cylinder portion of each drill 30 moves the diamond-containing bit portions 62 and 63 towards glass sheet G mounted between backup plate 70 and clamp pad 110.

As seen in Fig. 4, pipe 121 from valve 142 is in communication with pipe 96 of air cylinder 92 and pipe 120 from valve 142 is connected by pipe 95 to air cylinder 92. Along with the initiation of drills 30, as described above, the air cylinder 92 is provided with air under pressure by pipes 96 and 121 to extend piston rod 97 and air is exhausted from air cylinder 92 through pipes 95 and 120. The clamp pad 110 is brought against glass sheet G through this extension of piston rod 97. This occurs before bit portions 62 and 63 actually start their drilling engagement with the glass sheet G because drills 30 in their retracted positions for bits 60 and 61 are sufficiently far away from sheet G that the pad 110 engages sheet G before the bit portions 62 and 63 move into drilling contact with sheet G.

The other control chambers of valves 141 and 142 communicate by pipes 133 and 134 to poppet valve 124 and 127, respectively. Communicating with pipe 133 is pipe 147 communicating by pipe fitting 82 and poppet extension 78 to safety poppet valve 83.

Pipe 148 is in communication with pipe 121 of valve 142. A pipe 149 supplies water coolant from a source (not shown) to a valve 150, that is opened by air pressure in pipe 148 but is spring biased to a closed position. Pipe 149 through valve 150 supplies coolant to pipe 151, which communicates with pipes 131 and 132 connected to swivels 40. As a result, the application of air under pressures through pipe 121 by tripping poppet valve 135 provides air under pressure through pipe 148 to open valve 150 so that coolant is fed to swivels 40 with the operation of drills 30.

Before drill bit portions 62 and 63, drilling into the glass sheet G, contact each other, dog 123 trips poppet valve 124. Tripping of poppet valve 124 relieves air under pressure in pipe 133 and upsets the equalization of pressure between the two control chambers of valve 141 so that its slide valve is moved to its other position. Then pipe 120 from valve 141 becomes an air pressure line to the drill 30 that operates drill bit portion 62 and pressurized air in pipe 121 is released through pipe 146. This will stop immediately the rotation of drill bit portion 62. The air cylinder in that drill 30 will then retract drill bit portion 62 away from glass sheet G. However, this change in valve 141 does not affect valve 142. Thus the other drill 30 will continue to drive bit portion 63 forwardly into sheet G while rotating it.

The drilling by bit portion 63 continues until dog 126 trips poppet valve 127. Dog 126 is positioned so that it does not trip poppet valve 127 until the leading edge of drill bit portion 63 has moved at least to the plane in the glass sheet G that was reached by the leading edge of drill bit portion 62 farther into glass sheet G.

Because in the preferred embodiment the wall of drill bit portion 63 is thicker than that of drill bit portion 62 a cylindrical glass plug 152 of glass having portions of different diameters, as shown in Fig. 1, is produced by the drilling of the hole. With the formation of a plug of this shape it is easily and automatically pushed out of sheet G by bit portion 63. For clarity in Fig. 1 the sheet G itself is not shown. Representative wall thicknesses of drill bit portions 62 and 63 are 1/32 and 1/16 inch, respectively. External diameters are the same.

When dog 126 trips poppet valve 127, pressure is relieved in pipe 134 so that an unbalance is created between the control chambers in valve 142 thereby shifting its slide valve to convert pipe 120, from valve 142 to drill 30 that operates bit portion 63, to a pressure line and to connect pipe 121 from that drill 30 through valve 142 to pipe 146 communicating with the atmosphere. At the same time pipe 120 provides air under pressure by pipe 95 to air cylinder 92 and air is exhausted from it through pipe 96 to pipe 121 of valve 142. Also at the same time, pipe 120 feeds air under pressure to the air cylinder of drill 30 that has been driving drill bit portion 63 and pipe 121 of that drill 30 becomes open to the atmosphere through pipe 146, so that its motor stops and its air cylinder retracts drill bit 61. Also because pipe 148 is in communication with pipe 121 from valve 142 the pressure of air in pipe 148 is relieved and valve 150 is closed by its spring to stop the flow of coolant to swivels 40.

Of course, if poppet valve 124 fails to create an unbalance between the pressures in the control chambers of valve 141 and thus retract drill bit 60, the moving push rod 89 and the poppet valve 83 on moving poppet extension 78 will contact each other before drill bit portions 62 and 63 come into contact. The opening of poppet valve 83 by rod 89 by pipes 133 and 147 momentarily reduces the pressure of air in one of the control chambers of valve 141 to produce the results described above when poppet valve 124 properly functions.

To initiate the operation of the apparatus the glass sheet is placed manually against backup plate 70 and its rubber pad 115 in the proper position as determined by locator blocks 128. By tripping poppet valve 135, as described above, the entire operation is initiated. At the end of the automatic sequence of operations the glass sheet G with its drilled hole is removed from between the backup plate 70 and clamp pad 110 which by that time has been returned to its unclamping position by retraction of rod 97 of air cylinder 92.

During the flow of coolant through bits 60 and 61 the coolant will flow downwardly along the faces of the glass sheet G and through hole 14 in table 12. The coolant will drop into drip pan 13 and then pass through its outlet pipe.

U.S. Patent No. 2,607,197 shows and describes an air feed drill of the type that is suitable as drills 30 for the apparatus of the present invention. Another type of air feed drill that is based on the same principle, as shown in that patent, is shown and described in U.S. Patent No. 2,674,098, granted on April 6, 1954, and entitled "Portable Power-Driven Tool for Drilling and Like Operations."

The foregoing description has been presented for purpose of illustration only. Various modifications of the apparatus will be apparent to one skilled in the art. The invention is limited only by the claims that follow.

I claim:

1. Apparatus for drilling a hole in a glass sheet comprising a supporting structure, a backup plate mounted to the supporting structure, a clamp pad, air-operated means mounted to the supporting structure to move the clamp pad between first and second positions, said glass sheet being held between said backup plate and said clamp pad in the second position, first and second opposed aligned glass-drilling means, each including an air feed drill mounted to the supporting structure, a fluid swivel and a hollow bit connected to said swivel, valved piping for coolant to the swivels, first valve means having a first position to operate the first glass-drilling means for rotating and moving the first bit in a direction toward the second bit and a second position to operate the first glass-drilling means for moving the first bit in the opposite direction, means operated by the first glass-drilling means to move the first valve means from the first position to the second position, second valve means having a first position to operate the second glass-drilling means for rotating and moving the second bit in a direction toward the first bit, to open the valved piping, and to operate the air-operated means for movement of the clamp pad from the first position to the second position and said second valve means having a second position to operate the second glass-drilling means for moving the second bit in the opposite direction, to close the valved piping, and to operate the air-operated means for movement of the clamp pad from the second position to the first position, means operated by the second glass-drilling means to move the second valve means from the first position to the second position, and means to move the first and second valve means from the second position to the first position.

2. The apparatus of claim 1 wherein the glass bits each has a drilling portion containing diamond particles imbedded in a matrix.

3. The apparatus of claim 2 where the walls thicknesses of the diamond-containing portion of the bits are different and the external diameters are the same.

4. The apparatus of claim 2 wherein the air-operated means includes an air cylinder having a piston rod and pivotally mounted to the supporting structure, a shaft rotatably mounted to the supporting structure about an axis parallel to the face of the backup plate opposing the clamp pad, a lever fixed on the shaft and pivotally connected to the piston rod, a clamp yoke pivotally supporting the clamp pad between the arms of the yoke and fixed on the shaft.

5. The apparatus of claim 1 and further including actuated means mounted to one of the swivels to move the first valve means from the first position to the second position and means mounted to the other swivel to actuate said means on said one of the swivels during movement of the swivels toward each other.

6. The apparatus of claim 1 wherein means operated by the first and second glass-drilling means to move the first and second valve means include poppet valves mounted to remain stationary during operation of the drills and dogs mounted to be moved by operation of said drills whereby the dogs trip the poppet valves during movement of the corresponding bit in the direction toward the other bit.

7. The apparatus of claim 6 and further including a poppet valve mounted to the first swivel and a push bar adjustably mounted to the second swivel whereby said push bar trips said poppet valve on the first swivel, during movement of the swivels toward each other, said poppet valve on the first swivel connected to said first valve means to move the first valve means from the first position to the second position.

References Cited in the file of this patent

UNITED STATES PATENTS

| | | |
|---|---|---|
| 1,883,993 | Lee | Oct. 25, 1932 |
| 1,904,975 | Babcock | Apr. 18, 1933 |
| 1,973,204 | Goss et al. | Sept. 11, 1934 |
| 2,588,267 | McLaughlin | Mar. 4, 1952 |
| 2,620,687 | Jones et al. | Dec. 9, 1952 |

FOREIGN PATENTS

| | | |
|---|---|---|
| 703,214 | Great Britain | Jan. 27, 1954 |